United States Patent [19]

Maki

[11] Patent Number: 4,523,658
[45] Date of Patent: Jun. 18, 1985

[54] BATTERY SHIELD

[76] Inventor: Ray Maki, c/o Mrs. Don Henderson, 10649 Longrifle Rd., Boise, Id. 83709

[21] Appl. No.: 493,022

[22] Filed: May 9, 1983

[51] Int. Cl.³ .............................................. B62D 25/00
[52] U.S. Cl. .................................................... 180/68.5
[58] Field of Search ................. 180/68.5; 429/96, 100, 429/175; 296/1 R; 248/503; 51/271; 206/333, 335

[56] References Cited

U.S. PATENT DOCUMENTS

| 1,217,838 | 2/1917 | Schmidt | 51/272 |
| 1,357,283 | 11/1920 | FitzGerald | 429/117 |
| 1,501,832 | 7/1924 | Amend | 429/96 |
| 2,213,010 | 8/1940 | MacPherson | 296/185 |
| 2,401,056 | 5/1946 | Dilley | 160/351 |

Primary Examiner—Joseph F. Peters, Jr.
Assistant Examiner—Mark C. Dukes
Attorney, Agent, or Firm—Gilbert A. Thomas

[57] ABSTRACT

A battery shield designed to accommodate all vehicles that use wet cells open or sealed, and is intended to protect the eyes and face of a service individual from splashing or flying corrosive liquid from an explosion or bubbling up of the battery. This shield is composed of a clear material about two inches larger than the battery and two auxiliary steel brackets to assist in attachment. Along one edge of the long sides are three holes to accommodate three screws for attachment purposes. At the ends and along the brackets are holes for attachment of the brackets to the automobile and to the shield. The shield is composed of clear transparent non-shatterable material. The bracket is composed of metal, plastic sheet or woven material.

4 Claims, 2 Drawing Figures

BATTERY SHIELD

BACKGROUND OF THE INVENTION

1. Field of the Invention

The field of art to which this invention pertains is to protective shields, particularly those designed to protect the eyes and face of a service individual from corrosive chemical emanating from a battery.

2. Description of the Prior Art

Conventional storage batteries used in most automobiles and trucks utilize an electrolyte which is acid. Modern batteries, particularly those manuactured during the last five years, are primarily of the sealed or add no liquid type. One of the shortcomings of this new type of battery is the tendency for explosions to occur occasionally, at which time flying acid could blind or disfigure any individual close to the vehicle when the hood or cover is up.

Prior art which has been discovered during a patent search has patents like U.S. Pat. Nos. 3,825,447; 1,357,283; 1,542,676; 1,501,832; 2,452,066 and 2,707,721 and are composed of heavy, complex containers to shield the entire battery and have, at least as their secondary design, the prevention of leaking acid from batteries. Others are complex shields like U.S. Pat. No. 2,232,800 or U.S. Pat. No. 1,844,499 and involve additional parts to shield each cell of the battery. The present invention is simple to manufacture and to use. It is composed of a simple flat shield of lexan ® a registered product of General Electric Company, or other non-shatterable, transparent material with two auxiliary steel attachment brachets fastened to one long end of the shield. Along the opposite end of the shield are three holes drilled to accomodate three $\frac{3}{4}''$ #10 screws to attach the shield to the vehicle. In the opposite ends of the brackets, away from the end that attaches to the shield is a hole that also accomodates a $\frac{3}{4}''$ #10 screw. Two other holes are spaced evenly to attach the bracket to the shield after finding the correct position for attachment. A drill is used to make screw holes in the shield.

One of the objects of this invention is to provide a lowcost shield to protect the face and eyes of a battery user from a battery explosion or eruption.

Another object of this invention is to provide an easily usable battery shield.

Still another object of this invention is to provide a simple means for attaching the shield to the car.

The above and still further highly important objects of this invention will become apparent from the following detailed specifications, appended claims and attached drawings.

DESCRIPTION OF THE DRAWINGS

Referring to the drawings which illustrate the invention and in which like characters indicate like parts throughout the drawings.

DESCRIPTION OF THE PREFERRED EMBODIMENT

Figure 1:
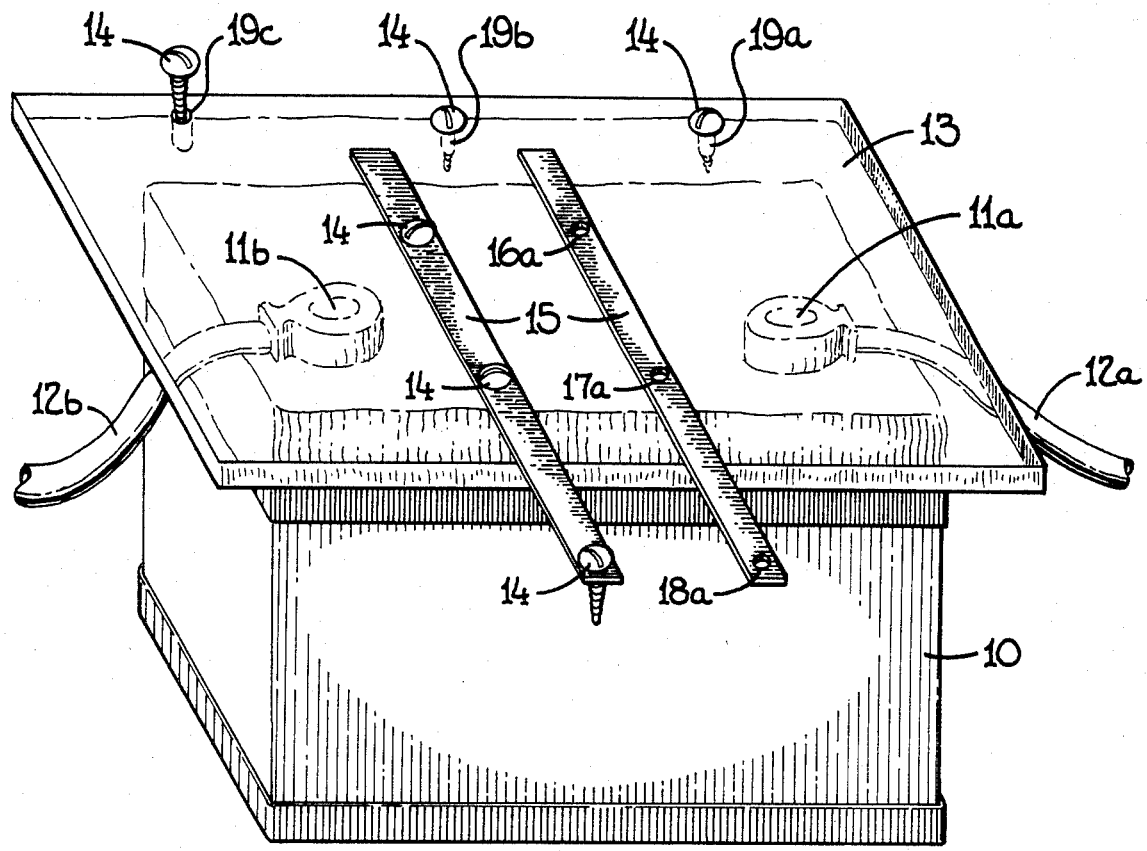
FIG. 1 is a top view of the articles of this invention.
Figure 2:
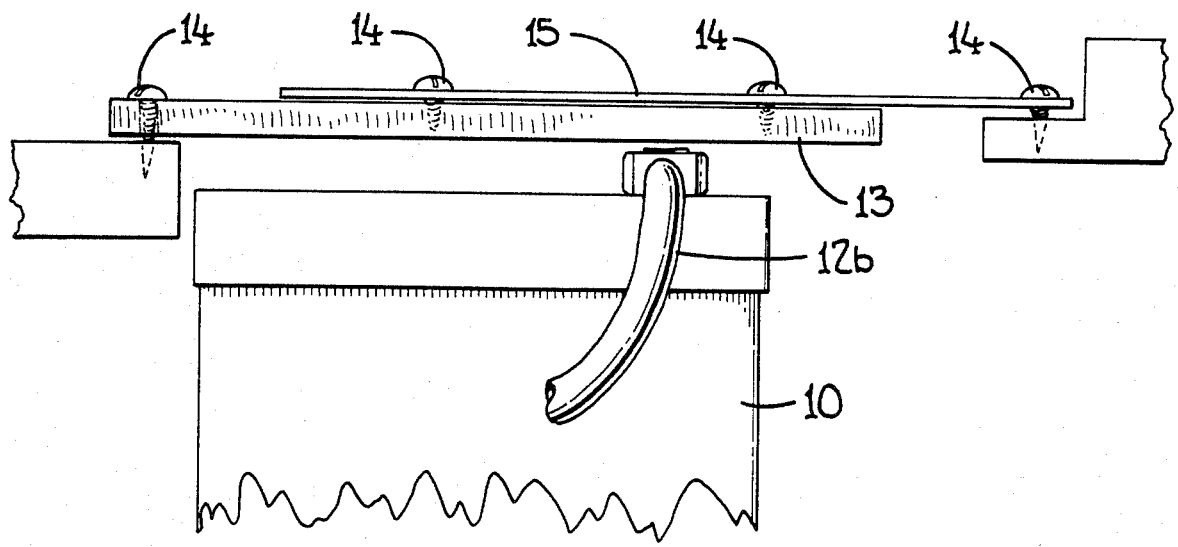
FIG. 2 is a side view of this invention.

In the drawing of FIG. 1, 10 is the typical sealed wet cell. 11a and b are the two poles of the dry cell. 12a and b are the wires connecting the wet cell to the car. The flat shield 13 rests upon the vehicle just above the battery top. Nine $\frac{3}{4}'' \times$ #10 screws 14 are provided. Two identical metal brackets 15 are also included with the invention for attaching the shield onto the vehicle and battery. Three holes 16a, 17a, and 18a are drilled in the brackets to accomodate the $\frac{3}{4}'' \times$ #10 screws 14.

The brackets 15 are made of metal, plastic sheet or woven plastic with eyelets as screw holes. In using the invention one merely places the shield 13 on the bracket or shelf above the battery. Into each of the holes 19a, 19b and 19c a $\frac{3}{4}'' \times$ #10 screw is inserted binding the shield to the vehicle. The two brackets are next located so as to attach to the vehicle and to the shield. Holes are drilled in the shield underneath holes 16a and 17a to accomodate the $\frac{3}{4}'' \times$ #10 screws, when the shield is located properly. When finally screwed in place the shield 13 provides a safe shield to protect any individual from flying acid or corrosive liquid caused by a battery explosion or boil up.

It can be seen that many other versions and modes of the invention could be practiced without departing from the spirit of the invention. These additional modes and the above description are intended to be included in the appended claims.

I claim:

1. A battery shield and vehicle containing the battery to be shielded composed of in combination;
    a vehicle containing a battery;
    a rectangular shield means 2 inches or larger than the battery to be shielded, containing a first set of at least three holes evenly spaced along one long end;
    two bracket means to assist attaching the shield means to the vehicle thus shielding the battery, said bracket means including a second set of holes, one hole within one inch of the end of the bracket means, the other two holes evenly spaced along the bracket means, said other holes matching up with a third set of holes in shield means; and
    at least six $\frac{3}{4}'' \times$ #10 screws for use in attaching the shield means and bracket means to each other and to the vehicle.

2. A battery shield and vehicle as described in claim 1 in which the shield means is a polycarbonate resin sheet material of at least 0.5 cm in thickness.

3. A battery shield and vehicle as in claim 1 in which the bracket means is metal.

4. A battery shield and vehicle as in claim 1 in which the bracket means is composed of a woven plastic material with eyelets for the screw holes.

* * * * *